United States Patent [19]

Hentschke et al.

[11] Patent Number: 4,573,167
[45] Date of Patent: Feb. 25, 1986

[54] DIGITAL COMMUNICATION SYSTEM, PARTICULARLY COLOR TELEVISION TRANSMISSION SYSTEM

[75] Inventors: Siegbert Hentschke, Tamm; Klaus Schaper, Stuttgart, both of Fed. Rep. of Germany

[73] Assignee: International Standard Electric Corporation, New York, N.Y.

[21] Appl. No.: 536,601

[22] Filed: Sep. 28, 1983

[30] Foreign Application Priority Data

Oct. 9, 1982 [DE] Fed. Rep. of Germany ....... 3237578

[51] Int. Cl.$^4$ .............................................. H03M 7/38
[52] U.S. Cl. .................................... 375/27; 332/11 D; 358/135; 375/122
[58] Field of Search ...................... 375/25, 27, 30, 122; 358/13, 135, 136; 332/11 D

[56] References Cited

U.S. PATENT DOCUMENTS 3,403,226  9/1968  Wintringham ...................... 358/135
3,824,590  7/1974  Limb .................................. 358/135

OTHER PUBLICATIONS

"Digital Coding of NTSC Signals Using DPCM in the Hadamard-Transformed Domain", M. Ishii et al., Fujitsu Scientific and Technical Journal, Jun. 1976, pp. 123–138, 358–413.

Primary Examiner—Marc E. Bookbinder
Attorney, Agent, or Firm—John T. O'Halloran; Peter R. Ruzek

[57] ABSTRACT

To convert an input-word sequence into a digital line code of half the bit rate of the input-word sequence, particularly for digital color television signal transmission, an encoder is disclosed which has a difference branch in which the difference ($D_i$) between every two successive input words ($X_{i-1}$, $X_i$) is converted into a difference code word ($\hat{D}_i$) by adaptive PCM quantization, and a sum branch in which the sum ($S_i$) of the same successive input words ($X_{i-1}$, $X_i$) is converted into a difference code word ($\hat{S}_i + \hat{P}_i$) in a hybrid DPCM encoder. These two words are combined into a line code word ($C_i$) by an adder (9). The quantizing characteristic of the adaptive PCM quantizer (1) is selected as a function of the prediction error present within the hybrid DPCM encoder (2). The decoder at the receiver of the novel communication system splits up the received line code word ($C_i$) into the difference code word ($\hat{D}_i$) and the sum code word ($\hat{S}_i + \hat{P}_i$) and decodes these words into the original words ($D'_i$, $S'_i$) in an adaptive PCM requantizer (13) and a hybrid DPCM decoder (10, 11, Q1), respectively. The two words ($X'_{i-1}$, $X'_i$) of the original pair are recovered by addition, subtraction, and subsequent division in half. Like in the encoder, the quantizing characteristic of the adaptive PCM requantizer (13) is selected as a function of the prediction error present within the DPCM decoder (11).

3 Claims, 2 Drawing Figures

DIGITAL COMMUNICATION SYSTEM, PARTICULARLY COLOR TELEVISION TRANSMISSION SYSTEM

BACKGROUND OF THE INVENTION

The present invention relates to a digital communication system in which the initial bit rate is reduced for transmission in a transmission path at a transmitter that includes an encoder which converts a digital input word sequence into a line code with a reduced bit rate while a receiver arranged at the other end of the transmission path includes a decoder that converts the line code into a sequence of digital output words at the original bit rate.

Communication systems of this kind are disclosed in various references, e.g., in German Pat. No. 23 55 676. The encoder and the decoder used there are a DPCM encoder and a DPCM decoder, respectively (DPCM=differential pulse-code modulation).

In a DPCM encoder, a reduction of the bit rate to one half, which may be necessary for television picture transmission because of the predetermined sampling frequency and the predetermined maximum bit rate on the transmission path, is possible only by converting the input-word sequence, applied at the sampling rate with a word length of 8 bits, into an output-word sequence of the same word-repetition rate but with the word length halved, i.e., with 4 bits per word. However, this encoding results in a visible loss of quality.

SUMMARY OF THE INVENTION

Accordingly, the object of the invention is to provide a system of the above kind wherein the bit rate on the transmission path can be reduced to one half without impairing the quality of transmission.

This object is attained in that the digital communication system of the type here under consideration comprises an encoder arranged at the transmitter and operative for converting a sequence of digital input words having the initial bit rate into a line code consisting of consecutive digital line code words having the reduced transmission bit rate, this encoder including means for adding every two consecutive ones of the input words to one another to obtain a sum thereof, means for subtracting every two consecutive ones of the input words from one another to obtain a difference thereof, means for converting the difference into a difference code word, including adaptive PCM quantizing means having a variable quantizing characteristic, means for converting the sum into a sum code word, including hybrid DPCM encoding means which includes means for controlling the quantizing characteristic of the adaptive PCM quantizing means as a function of the prediction error present therein, and means for combining the sum and difference code words into the respective code line word; and a decoder arranged at the receiver and operative for converting the line code received from the transmission line into a sequence of digital output words having the initial bit rate, the decoder including means for separating the difference code word from the respective received line code word, means for decoding the respective difference code word, including adaptive PCM requantizing means having a variable quantizing characteristic, means for decoding the respective sum code word, including hybrid DPCM decoding means which includes means for controlling the quantizing characteristic of the adaptive PCM requantizing means as a function of the prediction error present therein, and means for recovering the original consecutive input words from the decoded sum and difference code words, including means for performing successive subtraction and addition of the decoded sum and difference code words and subsequent division of the results by two.

BRIEF DESCRIPTION OF THE DRAWING

The invention will now be explained in more detail, by way of example, with reference to the accompanying drawing, in which.

DETAILED DESCRIPTION OF THE PREFERRED EMBODIMENT

Figure 1:
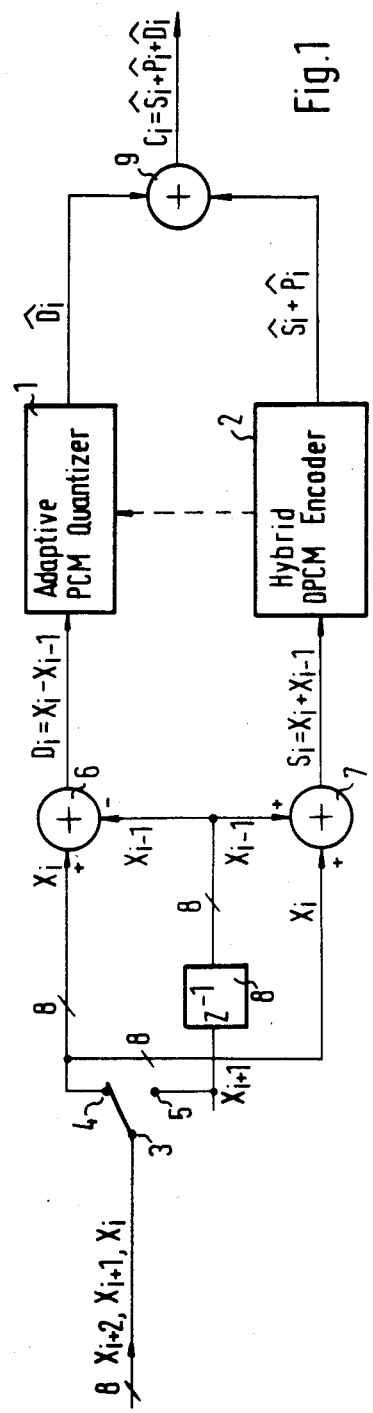
FIG. 1 shows the transmitter-side encoder of the novel system.

The encoder of FIG. 1 consists essentially of an adaptive PCM quantizer 1 and a hybrid DPCM encoder 2, which controls the selection of the quantizing characteristic of the adaptive PCM quantizer 1 dependent upon its instantaneous prediction error. The hybrid DPCM encoder 2 need not be described here because it is disclosed in "IEEE Transactions on Communications", Vol. Com-26, No. 3, March 1978, pp. 362 to 368.

The input of the encoder of FIG. 1 is presented with the sample values of the signal to be transmitted, which have been linearly coded into 8 bits per sample. The signal to be transmitted may be a speech signal or particularly a television signal. The successively encoded sample values thus form a word sequence, which is designated by $X_i$, $X_{i+1}$, $X_{i+2}$. A switch 3, whose switching period (not shown) is equal to twice the period of the input-word sequence, alternately transfers one input word to a terminal 4 and the subsequent input word to a terminal 5. If, for example, the word $X_i$ is transferred to the terminal 4, the terminal 5 will be presented with the word $X_{i+1}$. From the terminal 4, the word $X_i$ is fed to the positive input of an adder 6 and to the positive input of another adder 7, whereas the word $X_{i+1}$ is transferred from the terminal 5 through a delay stage 8, giving a delay of one word-repetition period, to a negative input of the adder 6 and to an input of the adder 7. The delay stage 8 thus provides the word $X_{i+1}$ if its input is presented with the word $X_{i+1}$. Hence, the adder 6 forms a difference $D_i = X_i - X_{i-1}$ from its input values, and the adder 7 forms a sum $S_i = X_i + X_{i-1}$ from the same input values. These values $D_i$ and $S_i$ each have a word-repetition rate equal to half the repetition rate of the input words $X_i$. The word sequence $D_i$ is the input-word sequence for the adaptive PCM quantizer 1, while the word sequence $S_i$ is the input-word sequence for the hybrid DPCM encoder 2.

The encoder thus consists of a so-called sum branch, in which the sum of two successive input words is encoded, and a difference branch, in which the difference between the same two successive input words is encoded. Since a hybrid DPCM encoder converts an input word $S_i$ into a DPCM-encoder word $\hat{S}_i$ and adds the PCM-encoded prediction value $\hat{P}_i$ to this word $\hat{S}_i$, as is well known, the output word resulting from $S_i$ is shown as a sum $\hat{S}_i + \hat{P}_i$. In the difference branch the adaptive PCM quantizer 1 converts its input word $\hat{D}_i$ into a code word $\hat{D}_i$. By adding the code word $\hat{D}_i$ from the difference branch and the code word $\hat{S}_i + \hat{P}_i$ from the sum branch in an adder 9, the line code word $C_i$ is obtained, whose length, like the length of the input word $X_i$, is 8 bits, and whose repetition rate is half that of the input word.

The adder 9 may be replaced with other circuits combining the two code words into the line code word $C_i$. It is possible, for example, to simply string the two code words together without addition, the sequence of bits of the rear code word being advantageously inverted in order that uncertainties in the splitting up of the code word $C_i$ into the two original code words at the receiving end will affect only the least significant bits of the two code words.

In the following description of the decoder at the receiving end it is assumed that the line code word C was formed by true addition of the two code words provided by the difference branch and the sum branch. Like in the conventional hybrid DPCM decoder, the prediction value $P_i$ from a DPCM decoder 11 is quantized in a quantizer Q1, and the resulting value $\hat{P}_i$ is subtracted from the received line code word $C_i = \hat{S}_i + \hat{P}_i + \hat{D}_i$ in an adder 10. The adder 10, the DPCM decoder 11, and the quantizer Q1 thus correspond to the conventional hybrid DPCM decoder except that the output word of the adder 10 cannot yet be used for DPCM decoding since it still contains the additively superimposed component $\hat{D}_i$ from the difference branch. To determine that component of the output word $\hat{S}_i + \hat{D}_i$ of the adder 10 which originates from the difference branch, i.e., the component $\hat{D}_i$, this output word is fed to a quantizer Q2, which determines the component $\hat{S}_i$ by a quantization corresponding to that performed during the DPCM encoding of the word $S_i$ at the receiver. Since $\hat{S}_i + \hat{D}_i$ does not correspond to any quantization level of the DPCM encoding used, $\hat{S}_i$ is taken as the quantization level lying directly below the value of $\hat{S}_i + \hat{D}_i$.

The input of the quantizer Q2 is connected to a positive input of an adder 12, while the output of the quantizer Q2 is coupled to a negative input of this adder, which thus provides the word originating from the difference branch, $\hat{D}_i$. In the difference branch of the decoder at the receiving end, an adaptive PCM requantizer converts the word $D_i$ into a decoded word $D'_i$, which, except for transmission errors, corresponds to the word $D_i$ formed in the encoder. Similarly, the DPCM decoder in the sum branch converts the word determined by the quantizer Q2, i.e., $S_i$, into a decoded word $S_i$, which, except for transmission errors, corresponds to the word $S_i$ formed in the encoder. In the decoder, like in the encoder, the quantizing characteristic in the PCM requantizer is selected as a function of the prediction error present within the DPCM decoder. As mentioned previously, the processing in the encoder takes place at half the repetition rate of the original word sequence $X_i$, and that in the hitherto described portion of the decoder at the same rate. To reconstruct the word sequence with the original repetition rate, $X'_i$, from the decoded words $D'_i$ and $S'_i$, the subsequent processing, which is described in the following, must take place at the original repetition rate of the word sequence $X_i$ (sampling rate) again. The repetition-rate conversion is performed in a buffer 14 for the difference, word $D'_i$, and in a buffer 15 for the difference word $S'_i$.

Figure 2:
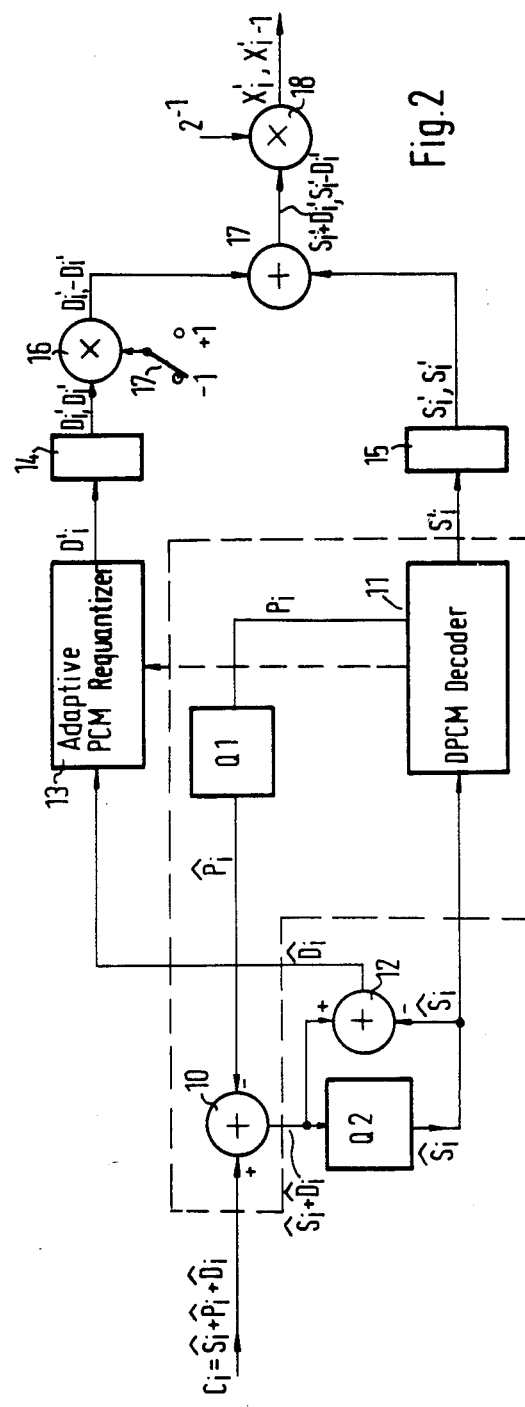
FIG. 2 shows the receiver-side decoder of the novel system.

The words $D'_i$ and $S'_i$ are written into the buffers 14 and 15, respectively, at half the original word-repetition rate, and read from these buffers at the original word-repetition rate, so that the outputs of the buffers provide the words $D'_i$ and $S'_i$, respectively, twice in succession. In the difference branch, the upper branch in FIG. 2, the buffer 14 is followed by a multiplier 16 which inverts the sign of every other of its input words. To this end, logic $-1$ and $+1$ are alternately applied at the repetition rate of the multiplier's input words to a control input of the multiplier 16 via a switch 17, which changes at this rate between two terminals that are at the two logic levels. The word sequence $-D'_i$, $D'_i$ from the output of the multiplier 16 and the word sequence $S'_i$, $S'_i$ from the output of the buffer 15 are fed to an adder 17, which combines them into the word sequence $S'_i - D'_i$, $S'_i + D'_i$. As is apparent from the addition and subtraction at the transmitting end, this word sequence is equal to the original word sequence multiplied by a factor of 2. The division in half is done by a multiplier 18, which performs a simple shift operation and, thus, provides the original word sequence $X'_{i-1}$, $X'_i$, which engages with the original input-word sequence except for transmission and quantizing errors.

As the encoder described processes the input information in two parallel paths and effects adaptation using a hybrid DPCM encoder, it may be called an "adaptive two-path hybrid encoder". Correspondingly, the decoder may be referred to as an "adaptive two-path hybrid decoder".

We claim:

1. A digital communication system of the type in which the bit rate of digital signals is reduced for transmission in a transmission path extending between a transmitter and a receiver from an initial bit rate to a reduced transmission bit rate, comprising an encoder arranged at the transmitter and operative for converting a sequence of digital input words having the initial bit rate into a line code consisting of consecutive digital line code words having the reduced transmission bit rate, said encoder including means for adding every two consecutive ones of the input words to one another to obtain a sum thereof, means for subtracting every two consecutive ones of the input words from one another to obtain a difference thereof, means for converting said difference into a difference code word, including adaptive PCM quantizing means having a variable quantizing characteristic, means for converting said sum into a sum code word, including hybrid DPCM encoding means which includes means for controlling said quantizing characteristic of said adaptive PCM quantizing means as a function of a prediction error present therein, and means for combining said sum and difference code words into the respective line code word; and a decoder arranged at the receiver and operative for converting the line code received from the transmission line into a sequence of digital output words having said initial bit rate, said decoder including means for separating said difference and sum code words from said respective received line code word, means for decoding said respective difference code word, including adaptive PCM requantizing means having a variable quantizing characteristic, means for decoding the respective sum code word, including DPCM decoding means which includes means for controlling said quantizing characteristic of said adaptive PCM requantizing means as a function of a prediction error present therein, and means for recovering the original consecutive input words from said decoded sum and difference code words, including means for performing successive subtraction and addition of said decoded sum and difference code words and subsequent division of the results by two.

2. The system as defined in claim 1, wherein said decoder further includes means for quantizing the prediction error of said DPCM decoding means and said separating means includes means for subtracting the quantized prediction error value from said respective line code word to obtain a modified line code word; and separating means means for quantizing said modified line code word in correspondence with the DPCM encoding taking place at said encoder to obtain the respective sum code word to be supplied as an input code word to said DPCM decoding means.

3. The system as defined in claim 2, wherein said separating means further includes means for subtracting the respective input code word to said DPCM decoding means from said modified line code word to obtain the respective difference code word to be supplied as an input code word to said adaptive PCM requantizing means.

* * * * *